(12) United States Patent
Hubbard (10) Patent No.: US 8,533,193 B2
(45) Date of Patent: Sep. 10, 2013

(54) MANAGING LOG ENTRIES (75) Inventor: Eric Hubbard, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 72 days.

(21) Appl. No.: 12/948,549

(22) Filed: Nov. 17, 2010

(65) Prior Publication Data

US 2012/0124047 A1 May 17, 2012

(51) Int. Cl.
*G06F 17/30* (2006.01)

(52) U.S. Cl.
USPC .......................................... 707/737; 709/224

(58) Field of Classification Search
USPC ............ 707/737, 999.002–999.005; 709/224
See application file for complete search history.

(56) References Cited

U.S. PATENT DOCUMENTS

| | | | |
|---|---|---|---|
| 5,448,722 A | 9/1995 | Lynne et al. | |
| 5,991,806 A | 11/1999 | McHann, Jr. | |
| 6,006,016 A | 12/1999 | Faigon et al. | |
| 6,343,236 B1 | 1/2002 | Gibson et al. | |
| 6,592,627 B1 | 7/2003 | Agrawal et al. | |
| 6,662,171 B1 | 12/2003 | Goertz | |
| 6,947,797 B2 | 9/2005 | Dean et al. | |
| 7,089,250 B2 | 8/2006 | Doganata et al. | |
| 7,143,392 B2 | 11/2006 | Ii et al. | |
| 7,171,590 B2 | 1/2007 | Kadoi | |
| 7,302,618 B1 | 11/2007 | Shafer et al. | |
| 7,668,953 B1 | 2/2010 | Sinclair et al. | |
| 7,716,319 B2 | 5/2010 | Kataoka et al. | |
| 7,721,152 B1 * | 5/2010 | Joshi et al. ...................... 714/25 |
| 7,747,083 B2 | 6/2010 | Tawde | |
| 7,788,370 B2 * | 8/2010 | Yugami ......................... 709/224 |
| 7,895,470 B2 | 2/2011 | Nastacio et al. | |
| 8,079,081 B1 * | 12/2011 | Lavrik et al. ..................... 726/22 |
| 8,095,830 B1 | 1/2012 | Cohen et al. | |
| 8,209,567 B2 | 6/2012 | Cohen et al. | |
| 2003/0101385 A1 | 5/2003 | Lee | |
| 2005/0010323 A1 | 1/2005 | Cocciadiferro et al. | |
| 2005/0027717 A1 | 2/2005 | Koudas et al. | |
| 2005/0065773 A1 | 3/2005 | Huang et al. | |
| 2005/0144526 A1 | 6/2005 | Banko | |
| 2006/0074597 A1 | 4/2006 | Raphael et al. | |
| 2006/0136417 A1 | 6/2006 | Avinash et al. | |
| 2006/0143291 A1 | 6/2006 | Hayamatsu | |
| 2006/0156077 A1 | 7/2006 | Altaf et al. | |
| 2006/0173863 A1 | 8/2006 | Paulus et al. | |
| 2006/0188011 A1 | 8/2006 | Goldszmidt et al. | |
| 2006/0195356 A1 | 8/2006 | Nerenhausen et al. | |
| 2007/0234426 A1 | 10/2007 | Khanolkar et al. | |
| 2007/0255979 A1 | 11/2007 | Deily et al. | |

(Continued)

OTHER PUBLICATIONS

Peng et al., "Event Summarization for System Management", SIGKDD, 2007, 5 pages.*

(Continued)

*Primary Examiner* — Monica Pyo (57) ABSTRACT

Example methods, apparatus, and articles of manufacture to manage log entries are disclosed. A disclosed example method involves grouping first log entries into a first group based on a matching portion among the first log entries. The example method also involves identifying a non-matching portion of the first log entries and associating an identifier with the non-matching portion. A processor is operated to generate a text string template comprising the identifier and the at least one matching portion in a human-readable format. The identifier replaces the non-matching portion in the template.

13 Claims, 10 Drawing Sheets

(56) References Cited

U.S. PATENT DOCUMENTS

| | | | |
|---|---|---|---|
| 2008/0010680 A1 | 1/2008 | Cao et al. |
| 2008/0103736 A1 | 5/2008 | Chin et al. |
| 2008/0162982 A1 | 7/2008 | Li et al. |
| 2008/0288482 A1 | 11/2008 | Chaudhuri et al. |
| 2008/0319940 A1 | 12/2008 | Garg et al. |
| 2010/0082555 A1 | 4/2010 | Ogawa et al. |
| 2010/0088354 A1 | 4/2010 | Wu et al. |
| 2010/0306587 A1 | 12/2010 | Liu et al. |

OTHER PUBLICATIONS

Pending and Unpublished U.S. Appl. No. 11/732,454, filed Apr. 3, 2007.
Aharon et al., "One Graph is worth a Thousand Logs: Uncovering Hidden Structures in Massive System Event Logs," HP-Labs Israel, Technion City, Haifa, Israel, ECML PKDD 2009, Sep. 7, 2009, 15 pages.
Pending and Unpublished U.S. Appl. No. 12/695,780, filed Jan. 28, 2010.
Jerry Shenk, "Demanding More from Log Management Systems," A SANS Whitepaper, Jun. 2008, 16 pages.
Aharon et al., "K-SVD: An Algorithm for Designing Overcomplete Dictionaries for Sparse Representation," IEEE Transactions on Signal Processing, vol. 54, No. 11, Nov. 2006, pp. 4311-4322.
Elad et al., "Image Denoising Via Sparse and Redundant Representations Over Learned Dictionaries," IEEE Transactions on Image Processing, vol. 15, No. 12, Dec. 2006, pp. 3736-3745.
Protter et al., "Image Sequence Denoising via Sparse and Redundant Representations," IEEE Transactions on Image Processing, vol. 18, No. 1, Jan. 2009, pp. 27-35.
Bryt et al., "Compression of Facial Images using the K-SVD Algorithm," Journal of Visual Communication and Image Processing, vol. 18, No. 4, May 2008, pp. 270-282.
Blei et al., "Latent Dirichlet Allocation," Journal of Machine Learning Research 3, 2003, 30 pages.
Cohen et al., "Correlating Instrumentation Data to System States: A Building Block for Automated Diagnosis and Control," In Proc. 6th USENIX OSDI, San Francisco, CA, Dec. 2004, 14 pages.
Cohen et al., "Capturing, Indexing, Clustering, and Retrieving System History," In Proc. 20th ACM SOSP, 2005, 14 pages.
Powers et al., "Short Term Performance Forecasting in Enterprise Systems," Computer Sciene Department, Standord University, Standford, CA, 2005,11 pages.
Hellerstein et al., "Discovering Actionable Patterns in Event Data," IBM Systems Journal, vol. 41, No. 3, 2002, pp. 475-493.
Li et al., "An Integrated Framework on Mining Logs Files for Computing System Management," KDD'05, Aug. 21-24, 2005, Chicago, Illinois, pp. 776-781.
Sabato et al., "Analyzing System Logs: A New View of What's Important," Second Workshop on Tracking Computer Systems Problems with Machine Learning Techniques (SysML07), 2007, pp. 1-7.
Xu et al., "Mining Console Logs for Large-Scale System Problem Detection," SysML, 2008, pp. 1-6.

\* cited by examiner

FIG. 1

LOG ENTRIES

FIG. 2

FIG. 3A TEMPLATE STORE

FIG. 3B LOCAL VARIABLE STORE

FIG. 4

FIG. 5
SEARCH USER INTERFACE

LOG METADATA
320

| ID | TEXT STRING TEMPLATES | EVENT | METRIC | PRC |
|---|---|---|---|---|
| 000 | "THE HOST <A001> HAS CRASHED." | | | |
| 001 | "CLIENT <A002> REQUIRES <A003>." | | | |
| 002 | "PROCESS <A004> STOPPED AT <A005>." | | | |
| 003 | "THE <A006> NETWORK IS <A007>." | | | |

376, 378, 380, 382, 384

TEXT STRING TEMPLATE STORE
FIG. 10A

374

LOG METADATA
320

| ID | VAR | DESC |
|---|---|---|
| 000 | A001 | HOST |
| 001 | A002 | CLIENT |
| 002 | A003 | UPDATE |
| 003 | A004 | PROCESS |
| 004 | A005 | TIME |
| 005 | A006 | LNET |
| 006 | A007 | STATUS |

386, 388, 390

VARIABLE IDENTIFIERS STORE
FIG. 10B

MANAGING LOG ENTRIES

BACKGROUND

Computer and network performance analysis systems generate log data to represent performance information and other process information associated with one or more systems. Such log data may be used to analyze performance of a single computer, a small network, or large enterprise networks spanning a campus or over several geographic regions. In some instances, information technology (IT) management solutions collect large amounts of data across hundreds and thousands of servers and applications in complex IT environments. The collected data can be stored for subsequent retrieval and analysis by IT personnel.

DETAILED DESCRIPTION

Traditional techniques for analyzing log files often require trained engineers or technically savvy individuals to review and understand their contents. Such trained personnel are expensive and their time is in short supply. Therefore, it is often expensive to analyze log files and such analysis can typically not be performed at short intervals. Unlike traditional techniques used to analyze log files, example methods, apparatus, and articles of manufacture described herein may be advantageously used to perform in-depth analyses and searches of log entries using nomenclature that is relatively easily understood by average or typical computer users without requiring such computer users to have extensive technical expertise in areas of computer system performance and maintenance monitoring.

In some examples, a processor system generates a text string template based on a group of log entries that have matching elements or portions and other elements or portions that do not match from one log entry to another. The processor system associates the non-matching portions or variable portions (e.g., variable keywords) of each log entry with the text string template. In this manner, the text string template in combination with a particular variable portion forms a log string that is representative of a particular log entry or multiple identical log entries repeated during a logging process. The processor system may also associate metadata or descriptive information about each log entry that may be used to identify, for example, types of events, levels of importance, statuses, or other characteristics associated with the log entries.

In illustrated examples described herein, the text string templates, variable portions, and metadata may be stored in one or more central repositories accessible from different clients. In addition, the processor system may automatically analyze newly generated log entries based on previously generated text string templates and associated variable portions and associate any newly generated log entry with matching ones of the text string templates and associated variable portions. In this manner, the processor system can categorize, classify, group, or otherwise associate newly generated log entries with previously specified metadata.

Example methods, apparatus, and articles of manufacture described herein can be advantageously used in enterprise network systems in which performance monitoring and logging processes generate log entries on a continuous basis. That is, instead of using traditional techniques requiring a specialized technical individual to review and analyze newly generated log entries to extract or gather particular types of information, example techniques described herein enable a processor system to analyze newly generated log entries periodically or aperiodically to associate recognizable ones of the new log entries with corresponding metadata automatically, and without user intervention. Users can then relatively easily access log entries and corresponding metadata to relatively quickly glean meaningful information therefrom about system performance or system operations relevant to the users without the need for or expectation of expensive trained personnel time.

Figure 1:
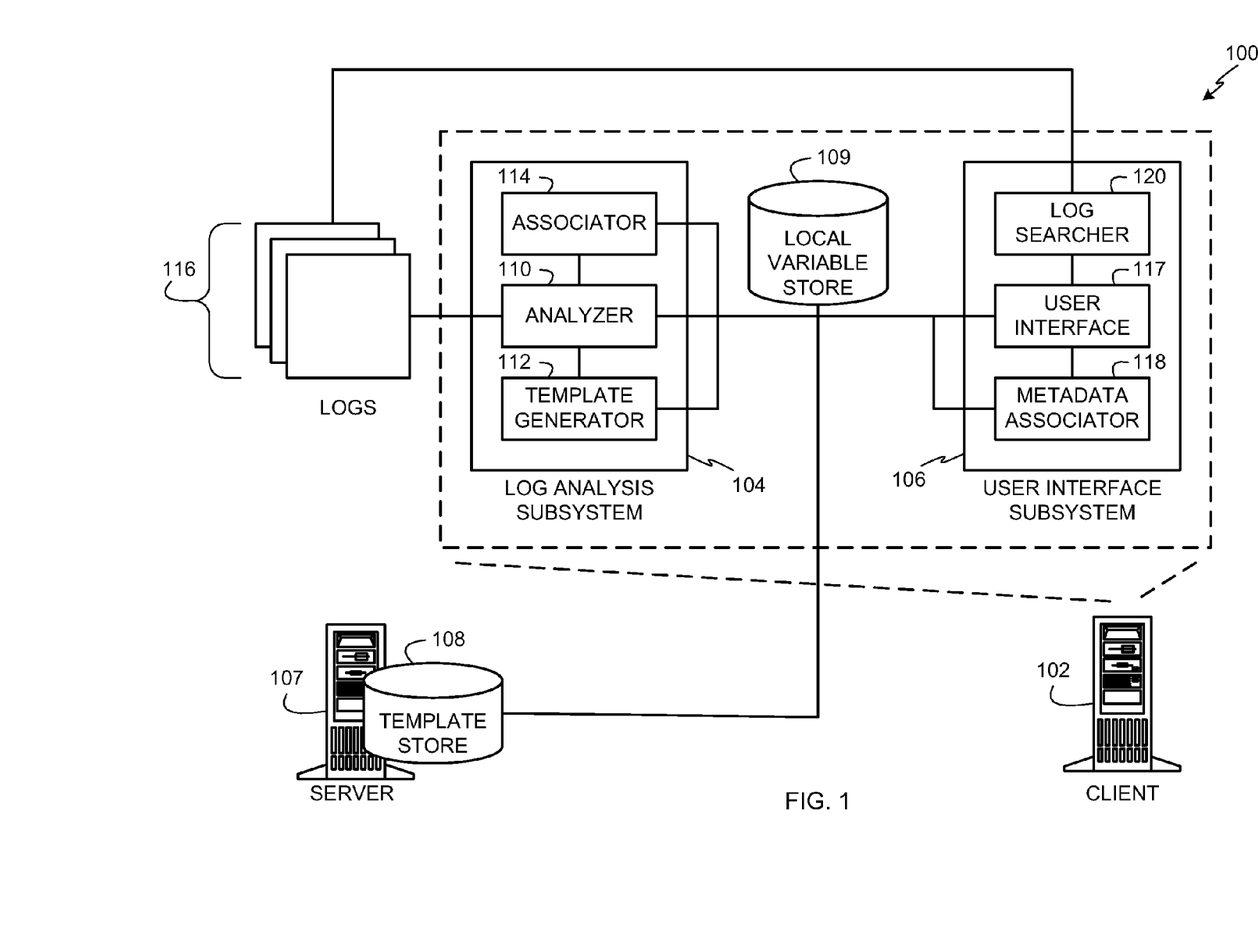
FIG. 1 depicts an example log processing system that may be used to analyze log entries and to store and access descriptive information associated with those log entries.

Turning to FIG. 1, an example log processing system 100 is illustrated which is adapted to automatically analyze log entries and to store and access descriptive information associated with those log entries. In the illustrated example, the log processing system 100 is implemented in a client 102 and includes a log analysis subsystem 104, a user interface subsystem 106, and a local variable store 109. In the illustrated example, the client 102 is in communication with a server 107. Although not shown, the server 107 may also be in communication with other clients that also include instances of the log processing system 100. To store text string templates and metadata corresponding to log entries analyzed by the log analysis subsystem 104, the server 107 is provided with a template store 108. The template store 108 operates as a central repository accessible from one or more clients (e.g., the client 102) for uploading new text string templates and/or for retrieving previously created text string templates.

The local variable store 109 stores variables (e.g., portions that vary between log entries that are associated with the same text string template) of log entries. Users may select ones of the variables in the local variable store 109 to retrieve corresponding log entries from log files on a network as discussed below. Although the log analysis subsystem 104, the user interface subsystem 106, and the local variable store 109 are shown as being implemented in the client 102, in other example implementations, one or more of the log analysis subsystem 104, the user interface subsystem 106, and the local variable store 109 may be implemented in the server 107.

Figure 2:
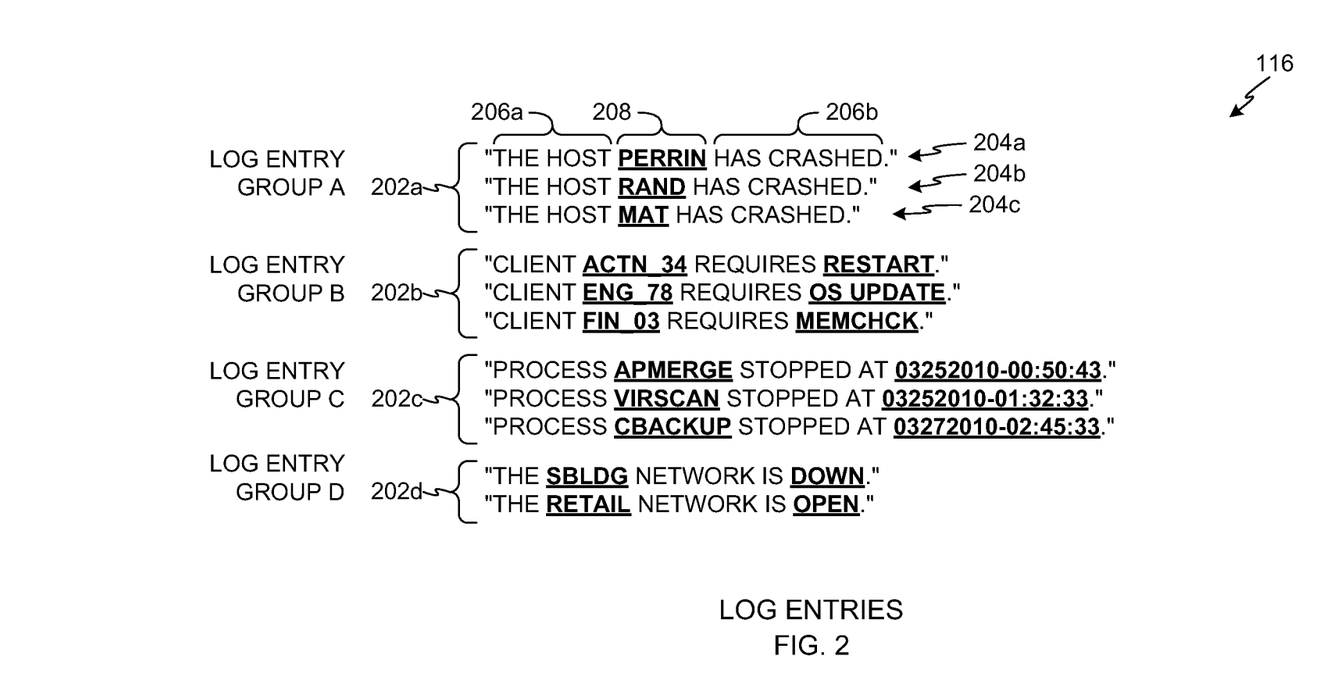
FIG. 2 depicts example log entries.

In the illustrated example of FIG. 1, the log analysis subsystem 104 includes an analyzer 110, a template generator 112, and an associator 114. The analyzer 110 accesses log entries 116 located in one or more distributed log files or databases throughout, for example, an enterprise network. Example log entries 116 are shown in FIG. 2. Turning briefly to FIG. 2, the analyzer 110 organizes the example log entries 116 into four separate groups (or clusters), namely log entry group A 202a, log entry group B 202b, log entry group C 202c, and log entry group D 202d based on characteristics of the log entries 116 as discussed below. Although each log entry group 202a-d is shown as having multiple log entries, in some instances a log entry group may have only one log entry. Each of the log entry groups 202a-d can be defined, characterized, or otherwise represented using a template that shares common or identical portions with each log entry in its group. For example, log entry group A 202a includes three log entries 204a-c, each of which includes two matching portions 206a and 206b that are the same or identical in each of the log entries 204a-c. In addition, each of the log entries 204a-c includes variable portions 208 (i.e., non-matching portions). The variable portions 208 are non-matching portions or portions that are different between each of the log entries 204a-c. Thus, a template to represent the log entries of log entry group A 202a may be defined as "THE HOST * HAS CRASHED," in which the asterisk (*) represents a variable or wildcard that can be equated to or defined using a variable keyword or portion (e.g., the variable portion 208) to specify or form any one of the particular log entries 204a-c corresponding to that variable keyword or portion. In the illustrated examples described herein, instead of using an asterisk (*) to represent variable portions in templates, variable portions are instead represented using variable identifiers (IDs). In this manner, log entries having more than one variable portion, such as the log entries of log entry groups 202b-d, can be represented using templates having different variable IDs to represent multiple variable portions. The variable portions 208 may represent different types of information including, for example, network entities (e.g., servers, clients, hosts, etc.), timestamps, actions, status information, etc.

Returning now to FIG. 1, the analyzer 110 may use pattern recognition techniques to detect matching portions (e.g., the matching portions 206a-b of FIG. 2) between log entries (e.g., the log entries 204a-c of FIG. 2) and variable portions (e.g., the variable portion 208 of FIG. 2) that do not match between those log entries. In this manner, the analyzer 110 can identify log entries that can be grouped with one another (e.g., the log entries 204a-c of the log entry group 202a of FIG. 2) and represented using a single text string template having one or more fixed text portions and one or more variables. The fixed text portions represent the matching portions (e.g., the matching portions 206a-b of FIG. 2) that match between the log entries and the one or more variables correspond to the variable portions (e.g., the variable portion 208 of FIG. 2) that vary between the log entries. In some example implementations, to associate log entries with particular ones of the log entry groups 202a-d, the analyzer 110 may use techniques (e.g., techniques for text/message clustering and Principle Atoms Recognition In Sets (PARIS) based on degrees of similarity or distance metrics between log messages) described in U.S. patent application Ser. No. 12/695, 780, entitled "System Event Logs," filed Jan. 28, 2010, and "One Graph is worth a Thousand Logs: Uncovering Hidden Structures in Massive System Event Logs," by Aharon et al. of HP-Labs Israel, Technion City, Haifa, Israel, September 2009, both of which are incorporated herein by reference in their entireties.

The template generator 112 generates templates based on the log entries analyzed and grouped by the analyzer 110 and stores the templates in the template store 108. For example, the template generator 112 can generate a template in text format to facilitate human readability for each of the log entry groups 202a-d shown in FIG. 2. In the illustrated example of FIG. 2, the template for log entry group A 202a can be, for example, "THE HOST <A001> HAS CRASHED." The template for log entry group B 202b can be, for example, "CLIENT <A002> REQUIRES <A003>." The template for log entry group C 202c can be, for example, "PROCESS <A004> STOPPED AT <A005>." The template for log entry group D 202d can be, for example, "THE <A006> NETWORK IS <A007>." In each of the templates, the notation <A00n> represents a unique variable for a corresponding variable portion (e.g., the variable portion 208 of FIG. 2).

The associator 114 associates existing templates with newly created log entries. That is, when new log entries are generated, such log entries may be accessed and analyzed by the analyzer 110. If the analyzer 110 determines (e.g., based on pattern and/or text matching) that a template and metadata already exist for a particular log entry, the associator 114 takes no action with respect to that log entry because a template and metadata corresponding to that log entry already exist. However, when the analyzer 110 determines that metadata does not yet exist for the particular log entry, the associator 114 associates the variable portions (e.g., variable data) of the log entry with a template (generated by the template generator 112 and/or stored in the template store 108). The association is accomplished when the associator 114 associates the variable portions of the log entry with the template such that a string recreating the log entry can be formed by combining the variable portions and the template. Template associations are discussed further below in connection with FIGS. 3A and 3B.

Referring now to the user interface subsystem 106, in the illustrated example, the user interface subsystem 106 is provided with a user interface 117, a metadata associator 118, and a log searcher 120. The user interface 117 is to provide graphical user interfaces (e.g., graphical user interfaces 400 and 500 of FIGS. 4 and 5) to present information to users and to receive user-provided data. The metadata associator 118 is provided to associate metadata provided by users (e.g., via the graphical user interface 400 of FIG. 4) with templates stored in the template store 108. Metadata is data about data. In the illustrated example, the metadata may be data that labels log data with information such as types of events, levels of importance, statuses, and/or other characteristics associated with the log entries. Association of metadata with templates is described below in connection with FIGS. 3A and 3B.

The log searcher 120 is provided to search log sources (e.g., data sources containing the log entries 116 and/or any other log entries) for log entries specified by users. For example, users may use the graphical user interface 500 of FIG. 5 to specify log entries to be searched based on templates and user-specified variable definitions.

In the illustrated example of FIG. 1, the log analysis subsystem 104 and the user interface subsystem 106 may be implemented as a single apparatus (e.g., in the client 102) or as separate apparatus (e.g., two or more different machines which may or may not include the client 102). While an example manner of implementing the subsystems 104 and 106 has been illustrated in FIG. 1, one or more of the elements, processes and/or devices illustrated in FIG. 1 may be combined, divided, re-arranged, omitted, eliminated and/or implemented in any other way. Further, the template store 108, the analyzer 110, the template generator 112, the associator 114, the user interface 117, the metadata associator 118, and the log searcher 120 and/or, more generally, the example apparatus implementing the example subsystems 104 and 106 may be implemented by hardware, software, firmware and/or any combination of hardware, software and/or firmware. Thus, for example, any of the template store 108, the analyzer 110, the template generator 112, the associator 114, the user interface 117, the metadata associator 118, and the log searcher 120 and/or, more generally, the example apparatus implementing the example subsystems 104 and 106 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the template store 108, the analyzer 110, the template generator 112, the associator 114, the user interface 117, the metadata associator 118, and/or the log searcher 120 are hereby expressly defined to include a computer readable medium such as a memory, DVD, CD, etc. storing the software and/or firmware. Further still, the example apparatus implementing the example subsystems 104 and 106 of FIG. 1 may include one or more elements, processes and/or devices in addition to, or instead of, those illustrated in FIG. 1, and/or may include more than one of any or all of the illustrated elements, processes and devices.

Figure 3A:
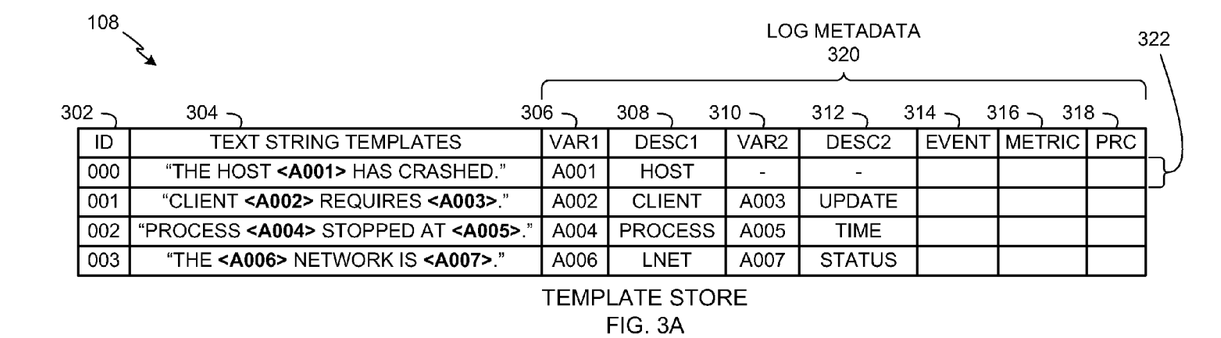
FIG. 3A depicts an example template store data structure in which the example log processing system of FIG. 1 may store descriptive information associated with log entries.

FIG. 3A depicts the example template store 108 of the example log processing system 100 of FIG. 1 to store descriptive information associated with log entries (e.g., the log entries 116 of FIGS. 1 and 2). As shown in FIG. 3, the data structure of the template store 108 includes an ID column 302, a text string templates column 304, a VAR1 column 306, a DESC1 column 308, a VAR2 column 310, a DESC2 column 312, an event column 314, a metric column 316, and a process (PRC) column 318. In the illustrated example, log metadata 320 is stored in the VAR1 column 306, the DESC1 column 308, the VAR2 column 310, the DESC2 column 312, the event column 314, the metric column 316, and the PRC column 318.

In the illustrated example, the ID column 302 stores unique IDs corresponding to respective text string templates stored in the text string templates column 304. The text string templates column 304 stores text string templates for groups of log entries (e.g., templates for the log entry groups 202a-d of FIG. 2). In the illustrated example, the text string templates in the text string templates column 304 are in human-readable format to facilitate user review and retrieval of ones of the text string templates to specify log entries for further analysis.

The VAR1 and VAR2 columns 306 and 310 and corresponding DESC1 and DESC2 columns 308 and 312 enable storing variable identifiers and descriptions for what those variable identifiers represent. The VAR1 and VAR2 columns 306 and 310 store identifiers (e.g., the identifiers 'A001', 'A002', 'A003', 'A004', 'A005', and 'A006') corresponding to variable portions (e.g., the variable portions 208 of FIG. 2) of log entries (e.g., the log entries 116 of FIGS. 1 and 2). The DESC1 and DESC2 columns 308 and 312 store short descriptions of the types of entities, processes, or other information to which the variable identifiers correspond. In the illustrated example of FIG. 3A, expressions or definitions for the variable 'A001' are host names, expressions or definitions for the variable 'A002' are client names, expressions or definitions for the variable 'A003' are types of updates, expressions or definitions for the variable 'A004' are process names, expressions or definitions for the variable 'A005' are timestamps, expressions or definitions for the variable 'A006' are local network (LNET) names, and expressions or definitions for the variable 'A007' are status identifiers. Other descriptions may alternatively or additionally be used (e.g., directory name, class name, etc.). The DESC1 and DESC2 columns 308 and 312 enable users to relatively easily discern the type of expression or definition corresponding to variable identifiers (e.g., the identifiers 'A001', 'A002', 'A003', 'A004', 'A005', and 'A006'). Although the data structure of the template store 108 is shown as accommodating only two variable portions, the data structure may be adapted to accommodate more variable portions for a text string template.

Figure 3B:
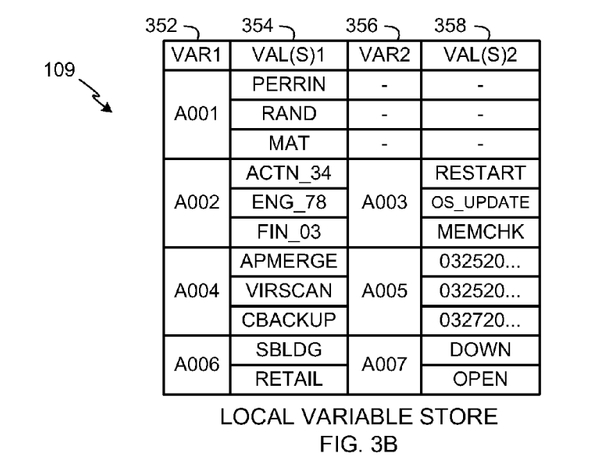
FIG. 3B depicts an example local variable store data structure in which the example log processing system of FIG. 1 may store variable information associated with log entries.

FIG. 3B depicts an example local variable store data structure 109 in which the example log processing system 100 of FIG. 1 may store variable information associated with the log entries 116. In the illustrated example of FIG. 3B, the local variable store data structure 109 includes variable identifier columns VAR1 and VAR2 352 and 356, which are similar to the VAR1 and VAR2 columns 306 and 310 of FIG. 3A. In the illustrated example, the local variable store data structure 109 also includes VAL(S)1 and VAL(S)2 columns 354 and 358. The VAR1 and VAR2 columns 352 and 356 and corresponding VAL(S)1 and VAL(S)2 columns 354 and 358 enable storing variable expressions or definitions that facilitate users to relatively quickly and easily identify portions of log entries in human-readable text format that are of interest to those users. The VAR1 and VAR2 columns 352 and 356 store identifiers (e.g., the identifiers 'A001', 'A002', 'A003', 'A004', 'A005', and 'A006') corresponding to variable portions (e.g., the variable portions 208 of FIG. 2) of log entries (e.g., the log entries 116 of FIGS. 1 and 2). In the illustrated example of FIG. 3B, the VAL(S)1 and VAL(S)2 columns 354 and 358 store expressions or definitions for variable portions (e.g., the variable portions 208 of FIG. 2) representative of text, numeric values, and/or symbols that appear in log entries (e.g., the log entries 116 of FIGS. 1 and 2) but that vary from one log entry to another within the same log entry group (e.g., one of the log entry groups 202a-d of FIG. 2). The VAL(S)1 column 354 stores expressions or definitions of variable portions corresponding to different VAR1 identifiers (e.g., the identifiers 'A001', 'A002', 'A004', and 'A006') of corresponding text string templates. The VAL(S)2 column 358 stores expressions or definitions of the variable portions that correspond to different VAR2 identifiers (e.g., the identifiers 'A003', 'A005', and 'A007') of corresponding text string templates. Although the data structure of the local variable store 109 is shown as accommodating only two variable portions, the data structure may be adapted to accommodate more variable portions for a text string template.

During operation, the log processing system 100 of FIG. 1 stores and retrieves text string templates and corresponding variable identifiers from the template store 108 at the server 107 and stores and retrieves variable identifiers and variable definitions or expressions from the local variable store 109 at the client 102. In this manner, users at the client 102 can select text string templates stored in the template store 108 and variable definitions or expressions stored in the local variable store 109 to view desired information (e.g., event information, metric information, or process information).

An association of a particular log entry (e.g., one of the log entries 116 of FIGS. 1 and 2) with a text string template in the text string templates column 304 of FIG. 3A occurs when the one or more variable portions of that log entry are stored in the VAL(S)1 column 354 and/or the VAL(S)2 column 358 of FIG. 3B for a corresponding text string template. For example, to associate the log entries 204a-c of FIG. 2 with the template for the log entry group A 202a of FIG. 2, the associator 114 of FIG. 1 stores the variable portions 'PERRIN', 'RAND', and 'MAT' in separate entries of the VAL(S)1 column 354 of FIG. 3B corresponding to the same variable identifier (e.g., the identifier 'A001') that is associated with the template "THE HOST <VAR1 > HAS CRASHED" shown in FIG. 3A.

In the illustrated example of FIG. 3A, the log processing system 100 of FIG. 1 creates a respective log metadata record in the template store 108 for each of the log entry groups 202a-d based on respective text string templates in the text string templates column 304. For example, for the log entry group 202a of FIG. 2, corresponding metadata is stored in a log metadata record 322 in the template store 108. In the illustrated example of FIG. 3A, each text string template stored in the text string templates column 304 can be associated with one or more log metadata records such as the log metadata record 322. For example, the text string template "THE HOST <A001> HAS CRASHED" may appear in another log metadata record having a different record ID in the ID column 302. In this manner, a single text string template can be associated with multiple log entries having respective metadata descriptive of different types of events, metrics, or processes in the event column 314, the metric column 316, and the PRC column 318 for the same text string template.

Referring now to the event column 314, the metric column 316, and the PRC column 318, each of these columns is provided to store descriptive or informative information about log entries (e.g., the log entries 116 of FIGS. 1 and 2) represented by the text string templates in the text string templates column 304. The event column 314 stores types of events defined for respective log metadata records (e.g., the log metadata record 322). For example, storing a critical error type identifier in the event column 314 for the log metadata record 322 associates the log metadata record 322 with all event log entries that are of the critical error type that match the corresponding text string template (e.g., "THE HOST <A001> HAS CRASHED"). In the illustrated examples, an event occurs at a particular point or instance in time and has associated therewith a level of importance or severity. An event is defined by a threshold or criterion that must be met, exceeded, or otherwise satisfied to log an instance of that event. The types of events in the event column 314 may be indicated by levels of severity or importance such as critical, warning, informative, etc.

The metric column 316 stores indications of performance metrics. In the illustrated examples described herein, a performance metric is a quantitative measure of performance of a process or any other measureable or observable aspect of a network system and/or processor system. In the illustrated examples described herein, a single log entry may be a part of multiple other log entries that, when combined, form a continuous performance metric that can be viewed using, for example, a line graph. Log entries that form performance metrics are indicated as such by storing descriptive metric identifiers in the metric column 316. A metric identifier may be a unique ID or descriptor that enables grouping a corresponding log entry with other, corresponding log entries of the same performance metric measurement.

The PRC column 318 stores status indicators of processes. Status indicators may specify starting points and stopping points of processes. In addition, status indicators may specify pre-process, mid-process, or post-process status information. Pre-process status information may indicate when a process is expected to begin. Mid-process status information may indicate whether a process is being performed without errors, whether any complications have arisen, and/or when a process is expected to complete. Post-process status information may indicate whether any error occurred or whether the process completed successfully without error.

In the illustrated example of FIG. 3A, event information, metric information, and/or process status information may be provided by a user via, for example, the user interface 117 of FIG. 1. In this manner, the metadata associator 118 may associate the event information, metric information, and/or process status information with corresponding log entries represented by respective text string templates in different log metadata records (e.g., the log metadata record 322).

A log entry may have multiple occurrences that are generated during a logging process. For example, the log entry 204a of FIG. 2 ("THE HOST PERRIN HAS CRASHED") may be logged each time the host perrin crashes. Thus, metadata stored in any of the event column 314, the metric column 316, and/or the PRC column 318 for the log metadata record 322 is associated with all instances of the log entry "THE HOST PERRIN HAS CRASHED." Similarly, the metadata is also associated with all instances of the log entries "THE HOST RAND HAS CRASHED" and "THE HOST MAT HAS CRASHED" because the definitions or expressions "PERRIN," "RAND," AND "MAT" are defined for the variable identifier 'A001' pertaining to the text string template "THE HOST <A001> HAS CRASHED." Thus, if a critical event type identifier is stored in the event column 314 for the log metadata record 322, all critical events are retrieved for "THE HOST PERRIN HAS CRASHED" event log entries if a user selects the text string template "THE HOST <A001> HAS CRASHED" and the variable expression or definition "PERRIN." Similarly, all critical events are retrieved for "THE HOST RAND HAS CRASHED" event log entries if a user selects the text string template "THE HOST <A001> HAS CRASHED" and the variable expression or definition "RAND."

In some instances, events, metrics, and processes can be mutually exclusive such that a log metadata record (e.g., the log metadata record 322) stores information corresponding only to one of an event, a metric, or a process. In other example implementations, the template store 108 may be provided with other metadata columns in addition to or instead of the event column 314, the metric column 316, and the PRC column 318 to enable associating other types of metadata with log entries.

Figure 10A:
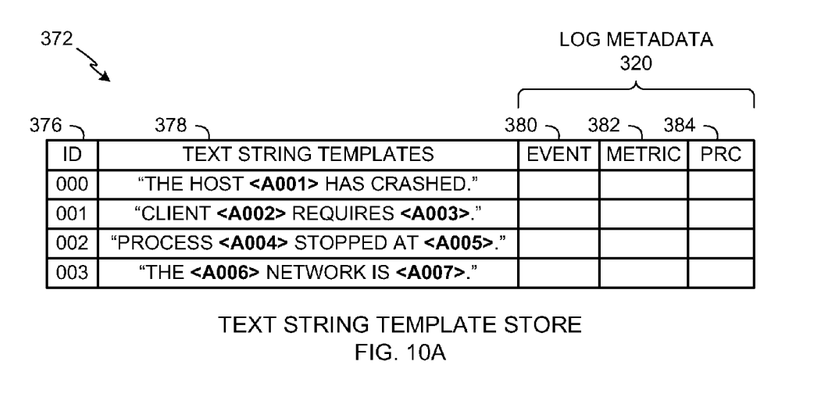
FIG. 10A depicts an example text string template store data structure in which the example log processing system of FIG. 1 may store text string templates and descriptive information associated with log entries.
Figure 10B:
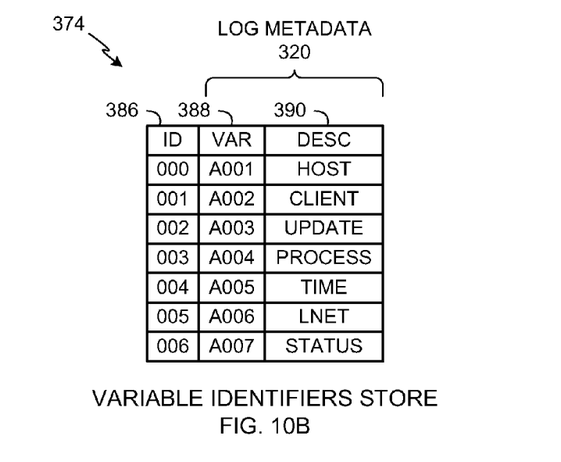
FIG. 10B depicts an example variable identifiers store data structure in which the example log processing system of FIG. 1 may store variable identifiers and descriptive information associated with log entries.

Referring to FIGS. 10A and 10B, an alternative example implementation of the template store 108 of FIGS. 1 and 3A involves storing the information from the template store 108 as two separate data structures. For example, FIG. 10A depicts a text string template data structure 372 and FIG. 10B depicts a variable identifiers data structure 374. The combination of the text string template data structure 372 and the variable identifiers data structure 374 comprises the same information of the template store 108 as shown in FIG. 3A. In particular, the text string template data structure 372 includes an ID column 376, a text string templates column 378, an event column 380, a metric column 382, and a process (PRC) column 384. The variable identifiers data structure 374 includes an ID column 386, a VAR column 388, and a DESC column 390.

The ID columns 376 and 386 are substantially similar or identical to the ID column 302 of FIG. 3A. In the illustrated examples of FIGS. 10A and 10B, log metadata entries in the text string template data structure 372 are matched or associated with log metadata entries in the variable identifiers data structure 374 based on the identifiers in the ID columns 376 and 386. The text string templates column 378 is substantially similar or identical to the text string templates column 304 of FIG. 3A.

As shown in FIGS. 10A and 10B, the log metadata 320 is distributed between the text string template data structure 372 and the variable identifiers data structure 374. The event column 380, the metric column 382, and the PRC column 384 are substantially similar or identical to respective ones of the event column 314, the metric column 316, and the PRC column 318 of FIG. 3A. In addition, the VAR column 388 and the DESC column 390 enable storing variable identifiers and descriptions for what those variable identifiers represent. The VAR columns 388 stores identifiers (e.g., the identifiers 'A001', 'A002', 'A003', 'A004', 'A005', and 'A006') corresponding to variable portions (e.g., the variable portions 208 of FIG. 2) of log entries (e.g., the log entries 116 of FIGS. 1 and 2). The DESC column 390 stores short descriptions of the types of entities, processes, or other information to which the variable identifiers correspond.

Figure 4:
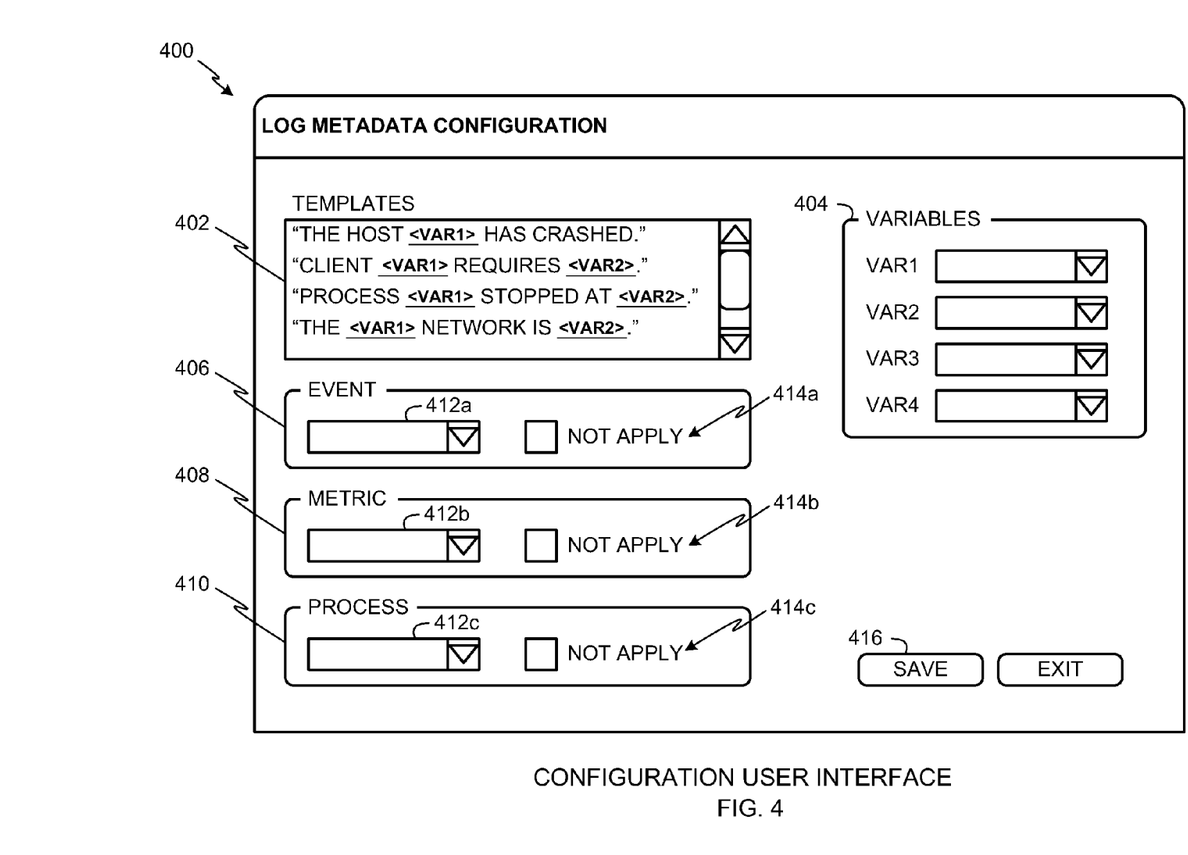
FIG. 4 depicts an example configuration graphical user interface of the example log processing system of FIG. 1 to enable user entry of metadata to associate with corresponding log entries.

FIG. 4 depicts an example configuration graphical user interface (GUI) 400 of the example log processing system 100 of FIG. 1 to enable user entry of log metadata (e.g., the log metadata 320 of FIGS. 3A, 10A, and 10B) to associate with corresponding log entries (e.g., the log entries 116 of FIGS. 1 and 2). The configuration GUI 400 may be implemented using the user interface 117 and the metadata associator 118 of FIG. 1 and displayed on a display of the client 102 and/or on other client computers connected to the server 107. For example, during startup or initialization of the configuration GUI 400, the user interface 117 may access text string templates and corresponding variable portions (e.g., the variable portions 208 of FIG. 2) for displaying as selectable options to enable users to specify log entries of interest.

In the illustrated example, the configuration GUI 400 includes a templates list 402, a variables definition section 404, an event metadata section 406, a metric metadata section 408, and a process metadata section 410. In other example implementations, the configuration GUI 400 may be provided with different or additional sections to enable users to enter other types of metadata to associate with log entries. The templates list 402 is provided to display user-selectable text string templates. The variables definition section 404 is provided to enable users to specify expressions or variable definitions for variable portions (e.g., the variable portions 208 of FIG. 2) of a selected text string template to specify a particular log entry (e.g., a particular one of the log entries 204a-c of FIG. 2) or a particular log entry group (e.g., a particular one of the log entry groups 202a-d of FIG. 2) with which to associate user-provided metadata. For example, to specify the log entry 204a ("THE HOST PERRIN HAS CRASHED") of FIG. 2, a user selects the text string template "THE HOST <VAR1> HAS CRASHED" in the templates list 402 and selects "PERRIN" in the variables definition section 404 using a drop-down list control for the variable VAR1. Alternatively, to specify a log entry group, a user selects a text string template (e.g., "THE HOST <VAR1> HAS CRASHED" in the templates list 402) without selecting any particular expression or definition in the variables definition section 404. In this manner, the user may associate metadata with all log entries of a log entry group (e.g., one of the log entry groups 202a-d of FIG. 2) associated with the selected text string template.

The event metadata section 406, the metric metadata section 408, and the process metadata section 410 are provided to enable users to enter respective metadata described above in connection with FIGS. 3A, 10A, and 10B for association with log entries or log entry groups specified using the templates list 402 and/or the variables definition section 404. In the illustrated example, each of the event metadata section 406, the metric metadata section 408, and the process metadata section 410 is provided with a respective drop-down list 412a-c for displaying and selecting pre-defined metadata. However, the drop-down lists may be adapted to additionally or alternatively receive custom user input metadata. Each of the event metadata section 406, the metric metadata section 408, and the process metadata section 410 is also provided with a 'NOT APPLY' check box 414a-c to enable users to specify whether a particular type of metadata does not apply for a selected log entry.

In the illustrated example of FIG. 4, when a user has provided the metadata to be associated with a specified log entry, the user can select a save button 416 to cause the metadata associator 118 of FIG. 1 to associate the user-provided metadata with the user-specified log entry by storing the user-provided metadata in a corresponding log metadata record (e.g., the log metadata record 322) of the template store 108 shown in FIG. 3A or the text string template data structure 372 (FIG. 10A) and the variable identifiers data structure 374 (FIG. 10B).

Figure 5:
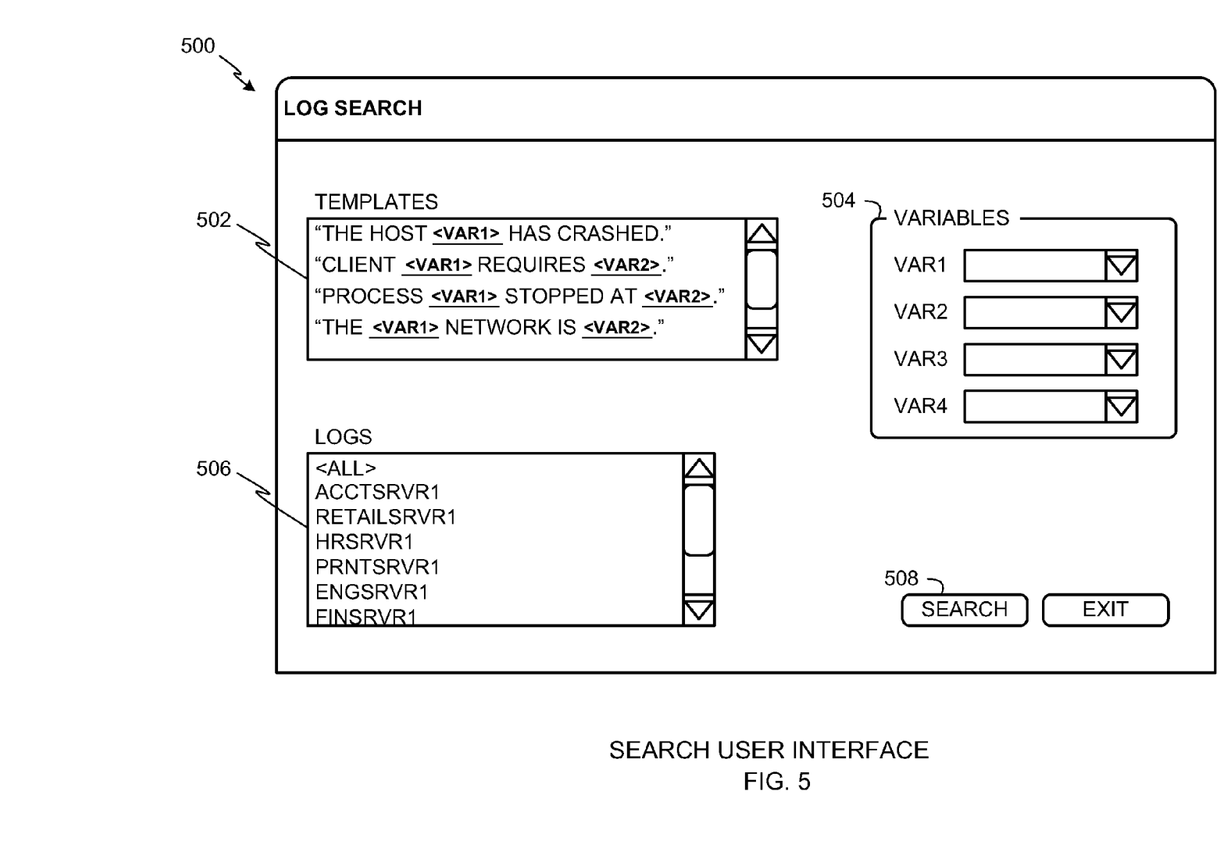
FIG. 5 depicts an example search graphical user interface of the example log processing system of FIG. 1 to enable users to search for log entries in one or more distributed log sources.

FIG. 5 depicts an example search GUI 500 of the example log processing system 100 of FIG. 1 to enable users to search for log entries (e.g., the log entries 116 of FIGS. 1 and 2) in one or more distributed log sources. The search GUI 500 may be implemented by the user interface 117 and the log searcher 120 of FIG. 1 and displayed on a display of the client 102 and/or on other client computers connected to the server 107. For example, during startup or initialization of the configuration GUI 400, the user interface 117 may access text string templates and corresponding variable portions (e.g., the variable portions 208 of FIG. 2) for displaying as selectable options to enable users to specify log entries to be searched.

In the illustrated example, the search GUI 500 includes a templates list 502, a variables definition section 504, and a log sources list 506. The templates list 502 is provided to display text string templates selectable by a user. The variables definition section 504 is provided to enable users to specify variable expressions for variable portions (e.g., the variable portions 208 of FIG. 2) of a selected text string template to specify a particular log entry (e.g., a particular one of the log entries 204a-c of FIG. 2) for which to search in one or more log sources. The log sources list 506 is provided to display log sources in which a log search may be performed. The log sources list 506 enables users to select one or more log sources for searching.

In the illustrated example, when a user specifies the required parameters to specify a log entry and one or more log sources, the user can initiate the search by pressing a search button 508. In response, the log searcher 120 (FIG. 1) searches for matching log entries in the specified log source(s) and returns results via the user interface 117.

Figure 6:
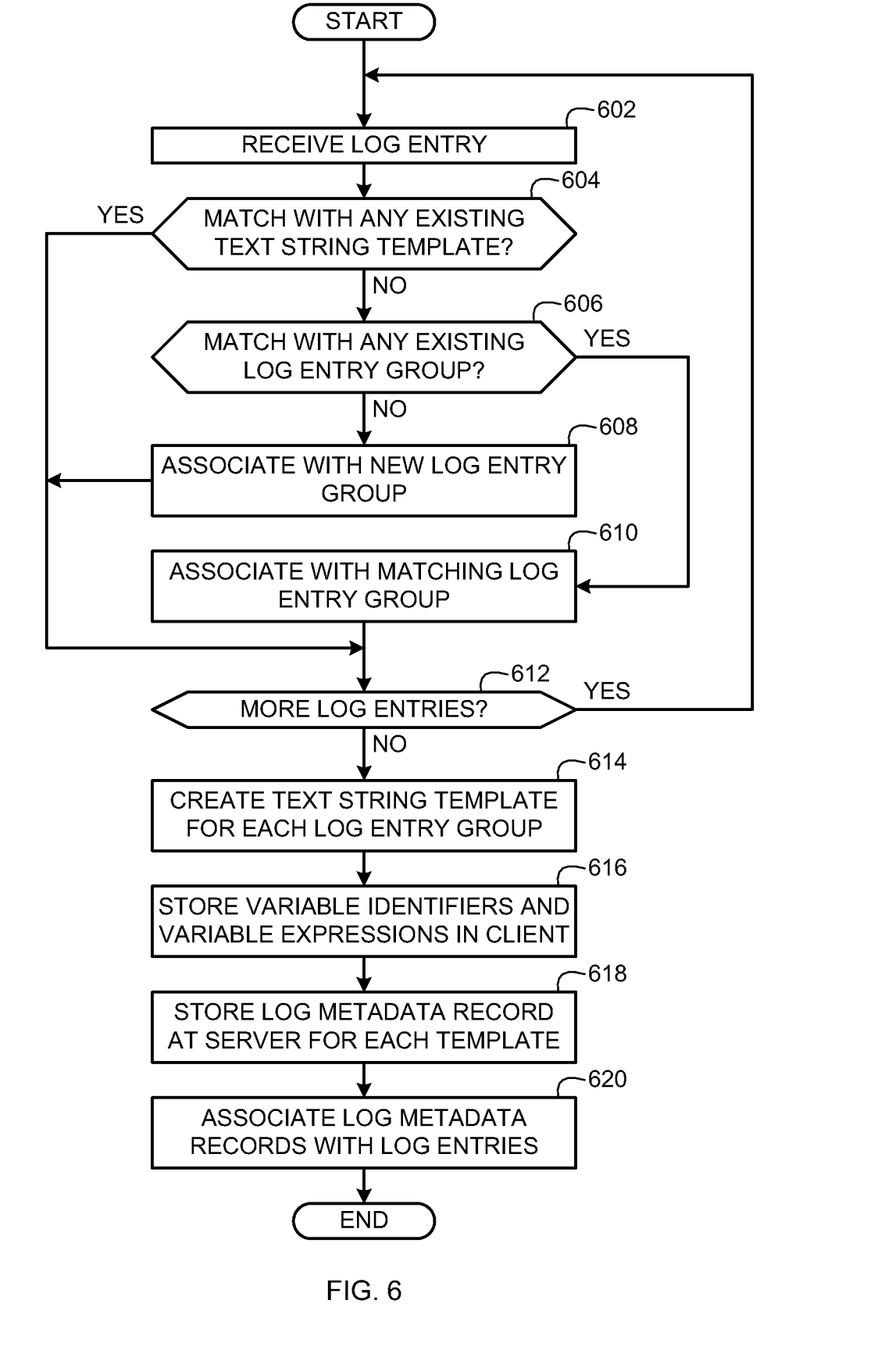
FIG. 6 depicts a flow diagram representative of example machine readable instructions to implement the example log processing system of FIG. 1 to associate log entries with respective text string templates.
Figure 7:
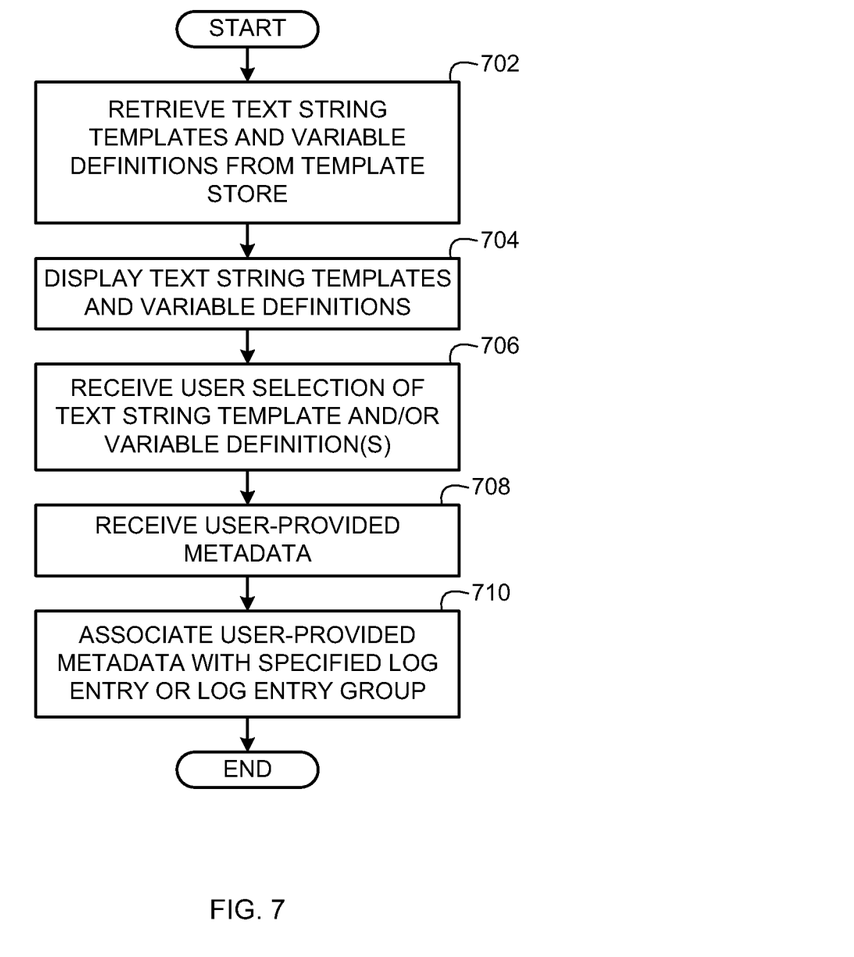
FIG. 7 depicts a flow diagram representative of example machine readable instructions to implement the example log processing system of FIG. 1 to associate metadata with respective log entries.
Figure 8:
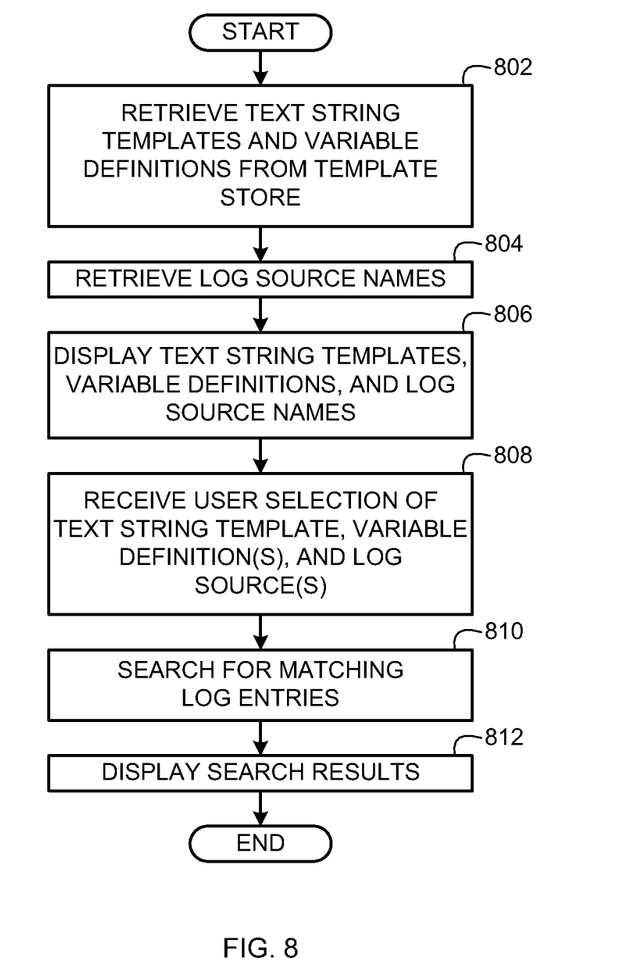
FIG. 8 depicts a flow diagram representative of example machine readable instructions to implement the example log processing system of FIG. 1 to search log sources for instances of user-specified log entries.

FIGS. 6-8 depict flow diagrams representative of example machine readable instructions to implement the example log processing system 100 of FIG. 1. In this example, the machine readable instructions comprise one or more programs for execution by a processor such as the processor 912 shown in the example computer 910 discussed below in connection with FIG. 9. The program may be embodied in software stored on a computer readable medium such as a CD-ROM, a floppy disk, a hard drive, a digital versatile disk (DVD), or a memory associated with the processor 912, but the entire program and/or parts thereof could alternatively be executed by a device other than the processor 912 and/or embodied in firmware or dedicated hardware. Further, although the example program(s) are described with reference to the flowcharts illustrated in FIGS. 6-8, many other methods of implementing the example log processing system 100 may alternatively be used. For example, the order of execution of the blocks may be changed, and/or some of the blocks described may be changed, eliminated, or combined.

As mentioned above, the example processes of FIGS. 6-8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Now turning in detail to FIG. 6, the depicted example process may be performed by the log analysis subsystem 104 of FIG. 1 to associate log entries (e.g., the log entries 116 of FIGS. 1 and 2) with respective text string templates (e.g., the text string templates in the text string templates column 304 of FIG. 3A or the text string templates column 378 of FIG. 10A). Initially, the analyzer 110 of FIG. 1 receives a log entry (e.g., one of the log entries 116) (block 602) and determines whether the log entry 116 matches any existing text string template (block 604). For example, the analyzer 110 may use pattern recognition or text recognition to compare the log entry with all of the text string templates stored in the text string template column 304 of the template store 108 shown in FIG. 3A (or with all of the text string templates stored in the text string template column 378 of FIG. 10A). Additionally or alternatively, the analyzer 110 may use a text clustering algorithm and a Principle Atoms Recognition In Sets (PARIS) algorithm based on distance metrics between log messages as described in "One Graph is worth a Thousand Logs: Uncovering Hidden Structures in Massive System Event Logs," by Aharon et al.

If the log entry does not match any existing text string template (block 604), the analyzer 110 determines whether the log entry matches any existing log entry group (block 606) such as, for example, any of the log entry groups 202a-d of FIG. 2. If the log entry does not match any existing log entry group, the analyzer 110 creates and associates the log entry with a new log entry group (block 608) for the log entry. In some example implementations, a log entry group must have at least two log entries to generate a corresponding template. That is, at least two log entries must be compared with one another to identify matching portions (e.g., the matching portions 206a-b of FIG. 2) and variable portions (e.g., the variable portions 208 of FIG. 2) between the log entries. However, in other example implementations, a log entry group need only have a single log entry to generate a corresponding template. In such implementations, variable portions (e.g., the variable portions 208 of FIG. 2) may be selected based on known variables (e.g., known host names, known processes, known status information, detected timestamp information, known directory names, etc.) and non-variable portions of the single log entry can be used to generate a text string template.

Otherwise, if at block 606 the analyzer 110 determines that the log entry matches an existing log entry group, the analyzer 110 associates (or adds) the log entry with the matching log entry group (block 610). After associating the log entry with a log entry group at block 610 or at block 608, the analyzer 110 determines whether there are more log entries to analyze (block 612). For example, a user may specify one or more log files for the log analysis subsystem 104 to process. If the analyzer 110 determines at block 612 that at least another log entry remains to be analyzed, control returns to block 602 to receive another log entry. Otherwise, if at block 612, the analyzer 110 determines that no more log entries remain to be analyzed, the template generator 112 creates a text string template for each log entry group (block 614). For example, the template generator 112 may generate the text string templates noted in the text string templates column 304 of FIG. 3A or 378 of FIG. 10A corresponding to respective ones of the log entry groups 202a-d of FIG. 2. In the illustrated example, the template generator 112 generates text string templates in human-readable format to facilitate user review and retrieval of ones of the text string templates to specify log entries for further analysis.

The analyzer 110 stores variable identifiers (e.g., the identifiers 'A001', 'A002', 'A003', 'A004', 'A005', and 'A006' of FIG. 3B) in the client 102 (block 616). For example, the analyzer 110 may store the variable identifiers in the local variable store 109 of FIGS. 1 and 3B. The analyzer 110 stores log metadata records (e.g., the log metadata record 322 of FIG. 3A) at the server 107 for each text string template created at block 614 (block 618). For example, the analyzer 107 may store the log metadata records in the template store 108 of FIGS. 1 and 3A or the text string template data structure 372 of FIG. 10B and the variable identifiers data structure 374 of FIG. 10B. The associator 114 associates the log metadata records with respective log entries (or log entry groups) (block 620). For example, the associator 114 associates the log metadata records with respective log entries received at block 602 by storing the same variable identifiers (e.g., the identifiers 'A001', 'A002', 'A003', 'A004', 'A005', and 'A006') in both the template store 108 at the server 107 and the local variable store 109 at the client 102. In this manner, variable expressions or definitions (e.g., "PERRIN", "RAND", "MAT", etc.) in the local variable store 109 are associated with corresponding text string templates in the template store 108 based on the variable identifiers (e.g., the identifiers 'A001', 'A002', 'A003', 'A004', 'A005', and 'A006'). The example process of FIG. 6 then ends.

Turning now to FIG. 7, the depicted example process may be performed by the user interface subsystem 106 of FIG. 1 to associate log metadata (e.g., the log metadata 320 of FIGS. 3A, 10A, and 10B) with respective log entries (e.g., the log entries 116 of FIGS. 1 and 2). Initially, the user interface 117 (FIG. 1) retrieves text string templates and variable definitions (block 702). For example, the user interface 117 can retrieve text string templates from the text string templates column 304 of FIG. 3A or the text string templates column 378 of FIG. 10A and corresponding variable definitions from the VAL(S)1 and VAL(S)2 columns 354 and 358 of FIG. 3B.

The user interface 117 displays the text string templates and variable definitions (block 704) via, for example, the configuration GUI 400 of FIG. 4. The user interface 117 receives user selections of a text string template and corresponding variable definition(s) (block 706). As discussed above, a user selects a text string template and variable definition(s) to specify a log entry formed thereby or a user may select only a text string template without selecting any variable definitions to specify an entire log entry group (e.g., one of the log entry groups 202a-d of FIG. 2. The user interface 117 may receive the user selection of a text string template via the templates list 402 of FIG. 4 and the user selection(s) of the variable definition(s) via the variables definition section 404 of FIG. 4.

The user interface 117 also receives user-provided metadata (block 708). For example, the user interface 117 may receive the metadata from one or more of the event metadata section 406, the metric metadata section 408, and/or the process metadata section 410. The metadata associator 118 associates the user-provided metadata with a specified log entry or log entry group (block 710) by, for example, storing the user-provided metadata in a log metadata record (e.g., the log metadata record 322 of FIG. 3A) associated with the specified log entry or log entry group. The example process of FIG. 7 then ends.

Turning now to FIG. 8, the depicted example process may be performed by the user interface subsystem 106 of FIG. 1 to search log sources for instances of user-specified log entries. Initially, the user interface 117 (FIG. 1) retrieves text string templates and variable definitions (block 802). For example, the user interface 117 can retrieve text string templates from the text string templates column 304 of FIG. 3A or the text string templates column 378 of FIG. 10A and corresponding variable definitions from the VAL(S)1 and VAL(S)2 columns 354 and 358 of FIG. 3B. The user interface 117 also retrieves log source names (block 804) of sources that store log entries in a distributed environment such as a network environment.

The user interface 117 displays the text string templates, the variable definitions, and the log source names (block 806) via, for example, the search GUI 500 of FIG. 5. The user interface 117 receives user selections of a text string template, corresponding variable definition(s), and one or more log source(s) (block 808). As discussed above, a user selects a text string template and variable definition(s) to specify a log entry formed thereby. The user interface 117 may receive the user selection of a text string template via the templates list 502 of FIG. 5, the user selection(s) of the variable definition(s) via the variables definition section 504 of FIG. 5, and the user selection(s) of one or more log source(s) via the log sources list 506 of FIG. 5.

The log searcher 120 searches the selected log source(s) to find and select instances of the specified log entry (block 810), and the user interface 117 displays the search results (block 812). In the illustrated example of FIG. 8, the search results include the matching instances of the log entries and any associated log metadata (e.g., the log metadata 320 of FIGS. 3, 10A, and 10B) stored in the template store 108 (or in the text string template store 372 of FIG. 10A and the variable identifiers store 374 of FIG. 10B). The example process of FIG. 8 then ends.

Figure 9:
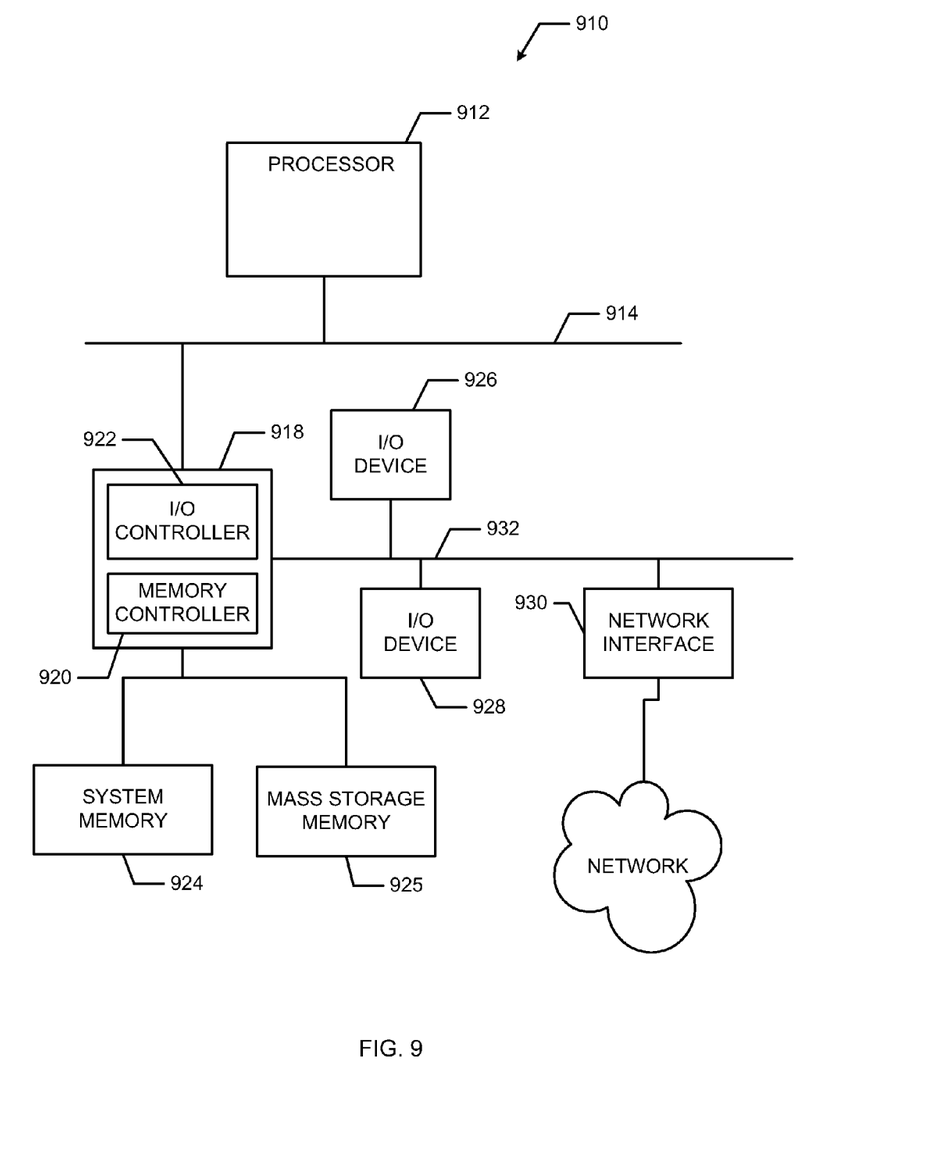
FIG. 9 is an example processor system that can be used to execute the example instructions of FIGS. 6-8 to implement the example log processing system of FIG. 1.

FIG. 9 is a block diagram of an example processor system 910 that may be used to implement the example methods, apparatus, and articles of manufacture described herein. For example, a processor system substantially similar or identical to the example processor system 910 may be used to implement the log analysis subsystem 104 and/or the user interface subsystem 106 of FIG. 1 to implement the example template data store 108 (FIGS. 1 and 3A), the local variables data store 109 (FIGS. 1 and 3B), the text string template store 372 (FIG. 10A), the variable identifiers store 374 (FIG. 10B), the GUIs 400 (FIG. 4) and 500 (FIG. 5) and example techniques and features associated therewith as described above in connection with FIGS. 1-8.

As shown in FIG. 9, the processor system 910 includes a processor 912 that is coupled to an interconnection bus 914. The processor 912 may be any suitable processor, processing unit, or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. A chipset provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

In general, the system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a digital subscriber line (DSL) modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to manage log entries, the method comprising:
   grouping first log entries into a first group based on a matching portion among the first log entries;
   identifying a non-matching portion of the first log entries;
   associating an identifier with the non-matching portion;
   generating, with a processor, a text string template comprising the identifier and the matching portion in a human-readable format, the identifier replacing the non-matching portion in the template;
   providing the text string template via a user interface as a pre-generated template with a plurality of other pre-generated text string templates for selection by a user to search log entries;
   receiving a user input specifying a selected variable definition for the identifier associated with the non-matching portion;
   generating a search string based on the selected variable definition replacing the identifier in the text string template; and
   selecting ones of the first log entries having text matching the entire search string.

2. The method as defined in claim 1, further comprising:
   detecting a second log entry having a first portion matching the matching portion of the template; and
   updating the template to reference the second log entry and the first log entries.

3. The method as defined in claim 2, wherein updating the template to reference the second log entry and the first log entries comprises associating a non-matching portion of the second log entry with the text string template.

4. The method as defined in claim 1, further comprising:
   detecting a second non-matching portion among the first log entries; and
   structuring the text string template to include a second identifier to replace the second non-matching portion in the template.

5. The method as defined in claim 1, wherein the non-matching portion is indicative of different network entities.

6. An apparatus to manage log entries, the apparatus comprising:
   a user interface to:
      receive a first user input to select a pre-generated text string template presented via the user interface with a plurality of other pre-generated text string templates for selection by a user to search log entries, the pre-generated text string template comprising a matching portion present in at least two of the previously stored log entries, and a non-matching portion corresponding to non-matching portions between the at least two previously stored log entries;
      receive a second user input indicative of a definition for an identifier in the pre-generated text string template, the definition corresponding to one of the at least two previously stored log entries, the definition to replace the identifier of the pre-generated text string template to generate a search string that exactly matches with text of the one of the at least two previously stored log entries; and
      receive a third user input indicative of metadata to be associated with the one of the at least two log entries; and
   a processor to associate the metadata with the one of the at least two log entries.

7. The apparatus as defined in claim 6, wherein the user interface is to receive the text string template and the definition for the identifier via a search user interface, and the apparatus further comprising a log searcher to search a log source for an instance of a log entry that matches the text string template and the definition.

8. The apparatus as defined in claim 7, wherein the user interface is to present an instance of a matching log entry and the metadata for the matching log entry in response to finding the instance of the matching log entry.

9. The apparatus as defined in claim 6, wherein the non-matching portion corresponds to different network entities.

10. A tangible machine accessible storage device or disk comprising instructions that, when executed, cause a machine to at least:
    group first log entries based on at least one matching portion and at least one variable portion among the first log entries;
    associate an identifier with the at least one variable portion;
    generate a text string template comprising the identifier and the at least one matching portion in a human-readable format, the identifier replacing the at least one variable portion in the template, and the template being in reference to the first log entries;
    provide the text string template via a user interface as a pre-generated template with a plurality of other pre-generated text string templates for selection by a user to search log entries;
    receive a user input specifying a selected variable definition for the identifier associated with the at least one variable portion;
    generate a search string based on the selected variable definition replacing the identifier in the text string template; and
    select ones of the first log entries having text matching the entire search string.

11. The tangible machine accessible storage device or disk as defined in claim 10, wherein the variable portion among the first log entries are indicative of different network entities.

12. The tangible machine accessible storage device or disk as defined in claim 10 having instructions stored thereon that, when executed, cause the machine to:
    detect a match between the template and a second log entry based on the second log entry having a first portion matching the at least one matching portion of the first log entries; and
    based on the detected match, update the text string template to further be in reference to the second log entry and the first log entries.

13. The tangible machine accessible storage device or disk as defined in claim 12 having instructions stored thereon that, when executed, cause the machine to update the text string template to further be in reference to the second log entry and the first log entries by associating the text string template with a variable portion of the second log entry.

* * * * *